United States Patent [19]
Gellert

[11] Patent Number: 4,648,546
[45] Date of Patent: Mar. 10, 1987

[54] COMPOSITE PLATE METHOD OF MANUFACTURING INJECTION MOLDING MANIFOLD

[76] Inventor: Jobst U. Gellert, 7A Prince Street, Georgetown, Ontario, Canada, L7G 2X1

[21] Appl. No.: 725,799

[22] Filed: Apr. 22, 1985

[30] Foreign Application Priority Data

Apr. 9, 1985 [CA] Canada ................................... 478674

[51] Int. Cl.⁴ ........................... B23K 1/12; B23K 1/04
[52] U.S. Cl. .................................... 228/161; 228/165; 29/611
[58] Field of Search ............... 228/161, 164, 165, 174, 228/219, 221; 29/611; 222/146.5

[56] References Cited

U.S. PATENT DOCUMENTS

| | | | |
|---|---|---|---|
| 3,923,209 | 12/1975 | Roy | 222/478 |
| 4,033,485 | 7/1977 | Kohler | 222/146.5 |
| 4,050,890 | 9/1977 | Elliott et al. | 222/146.5 |
| 4,146,165 | 3/1979 | Lesgourges et al. | 228/161 |
| 4,355,460 | 10/1982 | Gellert | 29/611 |
| 4,424,622 | 1/1984 | Krause | 29/611 |
| 4,439,615 | 4/1984 | Gellert | 228/221 |
| 4,446,360 | 5/1984 | Gellert | 228/174 |
| 4,451,974 | 6/1984 | Gellert | 29/611 |

FOREIGN PATENT DOCUMENTS

1174020  9/1984  Canada ................................. 228/161
24592    2/1984  Japan .................................. 228/121

*Primary Examiner*—M. Jordan
*Attorney, Agent, or Firm*—Riches, McKenzie & Herbert

[57] ABSTRACT

This invention relates to a novel method of manufacturing an integral manifold for a multi-cavity injection molding system. The manifold has a melt passage which follows a tortuous path and is formed by milling matching grooves without any sharp bends in opposite surfaces of two plates which are then secured together. The manifold is formed of tool steel and also has an electrical heating element which is cast into a channel in its upper surface. The two plates are brazed together and the heating element is cast in the channel in a common heating step under a partial vacuum in a vacuum furnace. A highly conductive copper alloy flows around the heating element and diffuses by capillary action between the opposed surfaces of the plates to form a metallurgical bond with them to improve heat transfer away from the heating element and avoid leakage from the melt passage. This method has the advantage that it reduces the time required to make a manifold having a melt passage which branches to several outlet openings and it avoids the sharp bends in the melt passage necessarily associated with the previous drill and plug method, thereby providing a natural rheological balance.

8 Claims, 15 Drawing Figures

COMPOSITE PLATE METHOD OF MANUFACTURING INJECTION MOLDING MANIFOLD

BACKGROUND OF THE INVENTION

This invention relates generally to the manufacture of manifolds for multi-cavity injection molding systems, and more particular to an improved method of manufacturing a composite manifold having a tortuous melt passage with smooth bends and an integral heating element.

Manifolds of this general type have a common melt inlet opening on one external surface and a number of outlet openings on an opposite external surface. The melt passage in the manifold through which the melt from the inlet opening flows has several branches leading to the outlet openings. Furthermore, it is usually critical that the height or thickness of the manifold between the inlet and outlet openings be kept to a minimum. Therefore, the melt passage must necessarily be very tortuous and have a number of bends. However, in order to avoid unacceptable pressure drop and shear which can cause decomposition when molding certain engineering materials such as polyvinyl chloride and some polyesters, it is essential that the rheology of the melt passage configuration be adequate to provide streamlined flow by avoiding sharp bends or corners. Otherwise, excessive pressure drop and decomposition of the melt increases the cost of the system itself and reduces the quality of the product produced by the system.

Figure 1:
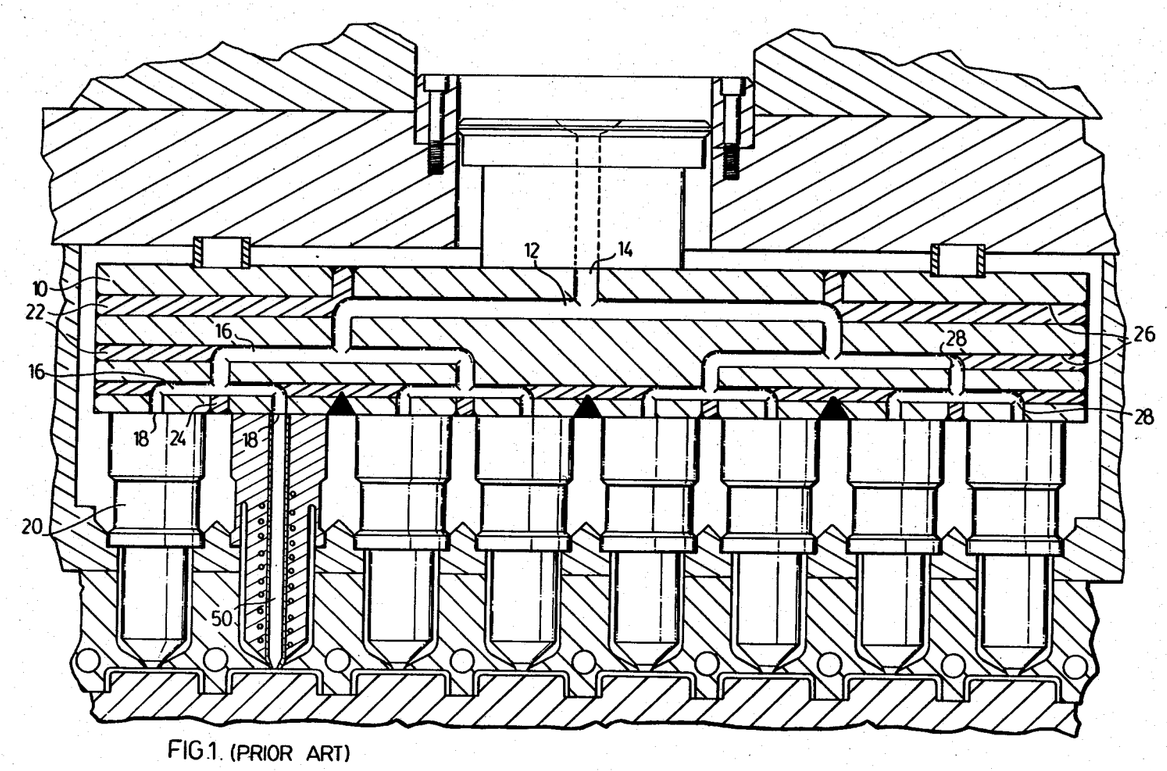
FIG. 1 is a sectional view of a portion of an injection molding system showing a manifold manufactured by a prior art method.

In the past, manifolds having a branching melt passage configuration such as this have been made by first drilling cross bores in the manifold, inserting welded plugs as required to close them off, and then drilling perpendicular intersecting bores (as shown in FIG. 1). In addition to necessarily forming sharp bends where the bores intersect and being labour intensive and therefore costly, this method has the disadvantage that the welded plugs occasionally crack and leak which requires the whole system to be shut down.

While attempts have been made to overcome these problems by using split manifold blocks which are clamped together during use, they have had the problem that the very considerable molding pressure of the melt often results in leakage. One example of this structure is shown in U.S. Pat. No. 3,923,209 to Roy which issued Dec. 2, 1975 and discloses a manifold with pie-shaped sectors arranged in a hub to withstand the pressure. However, it will be appreciated that this manifold configuration is not practical for many applications.

It is, of course, well known to provide the manifold with an electrical heating element to maintain the melt at a uniform temperature as it flows therethrough. As shown in the applicant's Canadian Pat. No. 1,174,020 which issued Sept. 11, 1984, it is even known to form an integral manifold by casting a heating element into a channel in the surface of the manifold in a vacuum furnace. However, the improved method of the present invention has the advantage that the split manifold plates are sealed together against leakage and a heating element is cast into the manifold in a single vacuum heating step. In addition to forming a manifold with excellent flow and temperature characteristics, this method considerably reduces manufacturing time and cost.

SUMMARY OF THE INVENTION

Accordingly, is an object of the present invention to at least partially overcome the problems of the prior art by providing an improved method of manufacturing injection molding manifolds having a melt passage extending along the abutting surfaces of two split plates and an integral electrical heating element.

To this end, in one of its aspects, the invention provides a method of manufacturing a composite injection molding manifold having a tortuous melt passage with several branches to convey melt from a common inlet opening to a plurality of outlet openings, and an electrically insulated electrical heating element extending therein with at least one terminal end projecting therefrom; comprising the steps of forming two plates of tool steel having matching opposed surfaces; machining matching grooves in the opposed surfaces of the plates, the grooves having smoothly curved bends to facilitate flow; securing the two plates together with the opposed surfaces abutting in a position wherein the matching grooves form the melt passage to improve flow of the melt therethrough; forming a channel in the upper external surface of the composite plates and locating the electrical heating element in the channel with at least one terminal end of the heating element extending from the channel, the heating element being secured in a predetermined position in the channel whereby a space is provided surrounding the heating element in the channel; locating a filler tube with an open mouth and a base on the said upper surface with the base communicating with the channel; sealing the channel around the said projecting terminal end of said electric heating element so as to seal the channel against substantial leakage and fixing the filler tube to the said upper surface; inserting a predetermined quantity of highly conductive material into the filler tube; heating the assembled unit in a vacuum furnace for a sufficient period of time under a partial vacuum and at a temperature whereby the highly conductive material is melted and flows into the continuous space around the heating element in the channel to form a metallurgical bond between the heating element and the highly conductive material and between the channel and the highly conductive material, and whereby highly conductive material provided between the abutting surfaces of the plates brazes the plates together and seals the melt passage against leakage; and machining off the filler tube.

Further objects and advantages of the invention will appear from the following description, taken together with the accompanying drawings.

DETAILED DESCRIPTION OF THE DRAWINGS

Reference is first made to FIG. 1 which shows a portion of an injection molding system with a manifold 10 manufactured of tool steel according to a prior art method. The melt passage 12 extends from an inlet opening 14 and has several lateral branches 16 which lead to the outlet openings 18 connecting with the nozzles 20. As is well known in the art, these passages are made by first gun drilling cross bores to form the lateral branches 16, inserting steel plugs 22 of a predetermined length and welding them in position, and then drilling perpendicular bores 24 to intersect the cross bores. Each cross bore is normally drilled in two stages: the first to form the lateral branch 16 of the passage, and the second to make the portion 26 which receives the plug 22 slightly larger in diameter. Making the plug receiving portion 26 of a larger diameter avoids the formation of a knife edge portion where the two bores intersect, but it does necessarily require more labour. As may be seen, the melt passage in manifolds made by this prior method have relatively sharp bends 28 where the two bores intersect. Furthermore, despite careful welding of the plugs 22 in position in the cross bores, it has been found that they are prone to leakage under the high operating temperatures and pressures. Of course, leakage around only one of these plugs 22 requires that the whole system be shut down to replace the leaking plug.

FIGS. 2-8 show successive stages or steps in the manufacture of a manifold 10 according to a first embodiment of the invention. For the sake of convenience, elements common to the prior art described above and the second embodiment described below will be referred to using the same reference numerals.

Figures 2, 3:
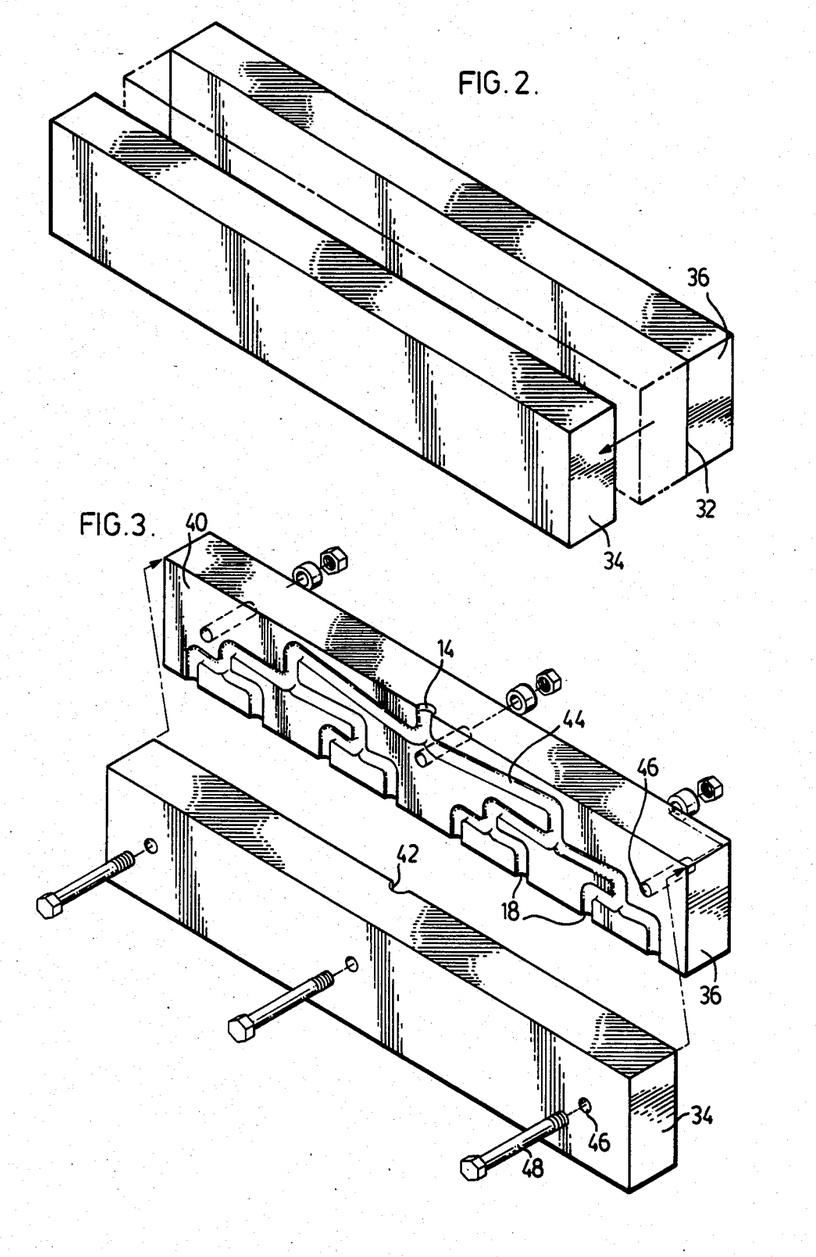
FIG. 2 is an isometric view showing two manifold plates prior to machining having opposed vertical surfaces according to one embodiment of the invention.
FIG. 3 is an isometric view showing the oppose surface of one of the plates after machining.

FIG. 2 shows a block of tool steel 30 which is cut along a vertical plane 32 to form two rectangular plates 34,36 having matching opposed flat surfaces 38,40. While reference is made throughout this description to vertical and horizontal planes and upper and lower surfaces, this is merely for convenience and refers to their orientation during the vacuum heating step. Of course, these planes do not necessarily have this orientation during use. While this figure shows the plates 34,36 being cut from the same block of steel 30, they could be made separately. However, it is preferable if the grain direction of the steel is the same to minimize differences in heat expansion. It is also preferable if the opposed surfaces 38,40 are given a slightly textured finish by grinding them in opposite directions to facilitate the dispersion of highly conductive material between them by capillary action in the vacuum heating step described below.

Next, matching grooves 42,44 are milled in the respective opposed surfaces 38,40. While the grooves are not clearly shown in the surface 38 of plate 34, they are the same as grooves 44 shown in the other surface 40. As may be seen, the grooves extend from a single inlet opening 14 to outlet openings 18 corresponding in number to the number of nozzles 20 the system is designed for. The grooves are smoothly curved and do not have any sharp bends to cause excessive pressure drop and shear in the conveying pressurized melt through the melt passage 10, thus providing a natural rheological balance.

Figures 4, 5, 6:
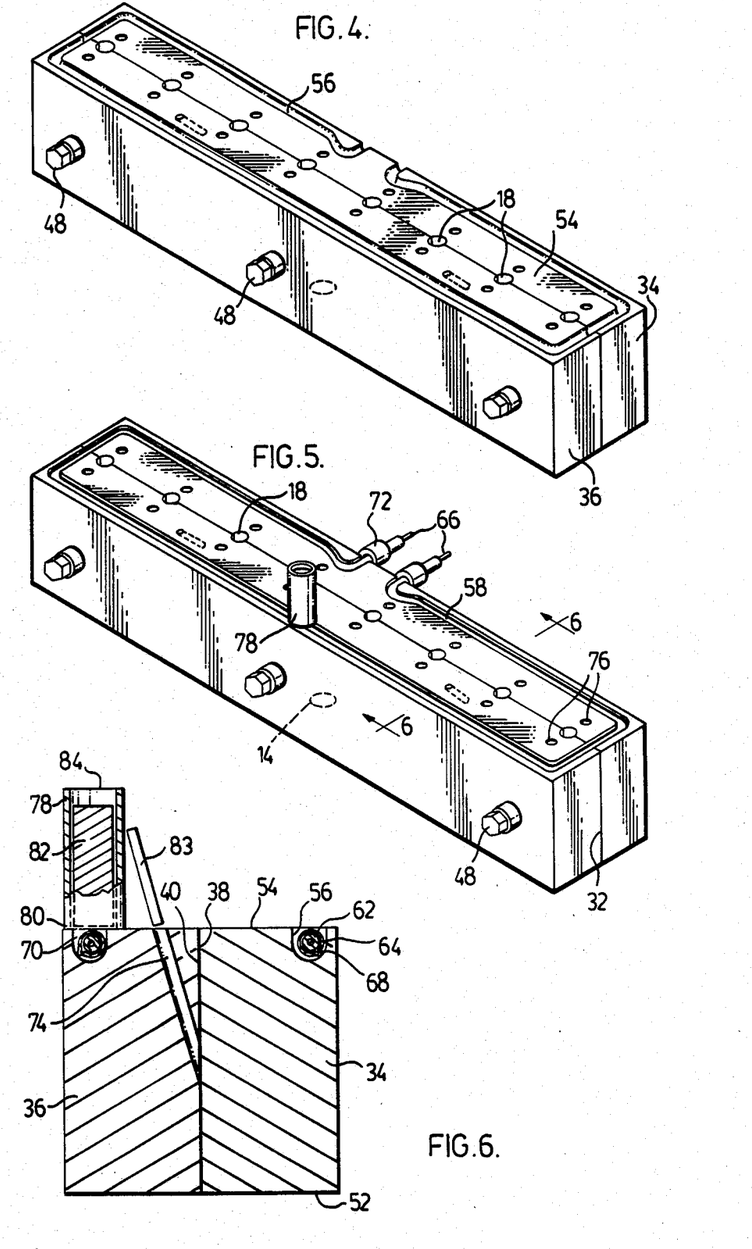
FIG. 4 is an isometric view showing the two plates secured together with a heating element channel cut in the upper surface.
FIG. 5 is an isometric view showing the heating element located in the channel and the filler tube fixed in position over the channel.
FIG. 6 is a sectional view along line 6—6 in FIG. 5 showing one of the ducts interconnecting the heating element channel and the abutting surfaces.
Figure 7:
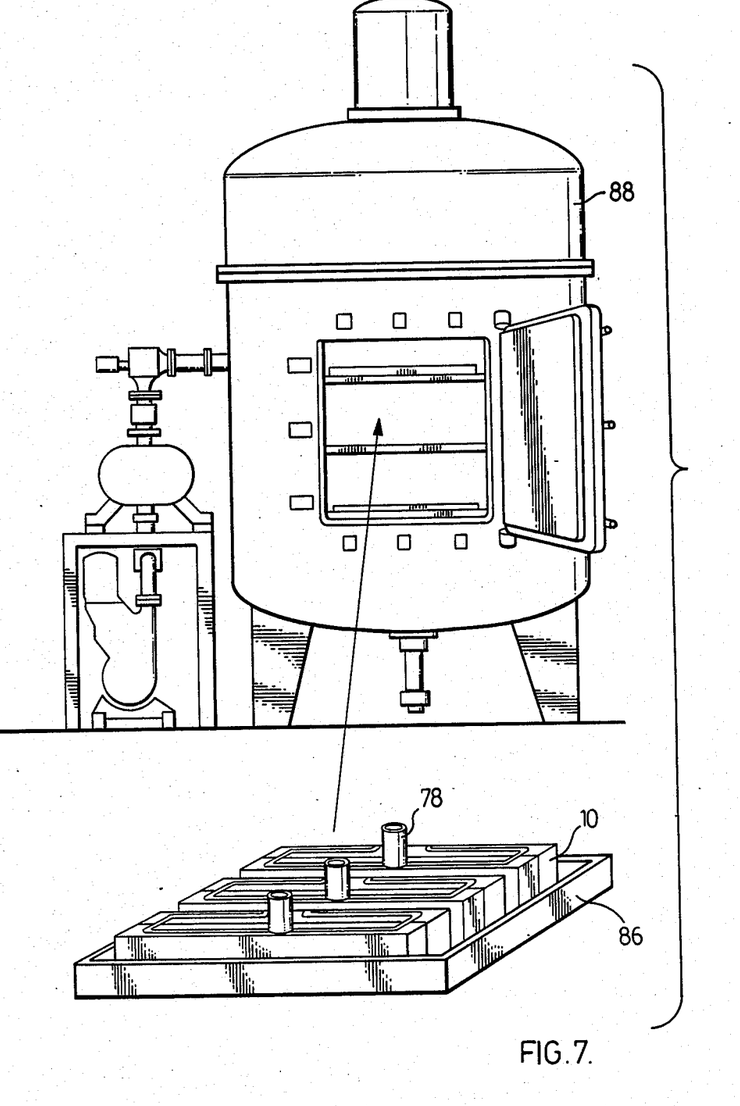
FIG. 7 shows several units in position on trays for insertion into a vacuum furnace.

Bolt holes 46 are drilled through the plates 34,36 and they are secured together by bolts 48, as shown in FIG. 4. As will be appreciated, in this position the matching grooves are aligned to form the melt passage 12 with several branches 16 extending from the common inlet opening 14 to the outlet openings 18 which, in use, are aligned with central bores 50 in the nozzles 20 (as shown in FIG. 1). The inlet opening 14 and outlet openings 18 are located on opposite external surfaces 52,54 of the manifold 10 and in this instance, it has been inverted to have the outlet openings 18 on the upper surface 54.

As shown in FIGS. 4 and 5, the upper surface 54 of the manifold has a channel 56 milled in it to receive an electrical heating element 58. in it. The heating element 58 has a central resistance wire 60 extending through a refractory powder 62 such as magnesium oxide powder in a metal casing 64. It has two terminal ends 66 which project from the manifold and has stainless steel spacer clips 68 crimped along it to provide a space 70 around it in the channel 56. The terminal ends 66 having sealing sleeves 72 which are slipped over them and slid up and welded against the manifold 10 to seal against leakage of melt from the channels. While this sealing can also be accomplished by brazing around the sleeves 72 in a vacuum furnace as described in the applicant's Canadian Pat. No. 1,174,020 mentioned above, welding avoids such an additional stage in a vacuum furnace. As may clearly be seen in FIG. 6, according to this embodiment, melt ducts 74 are drilled to extend diagonally from the upper surface 54 to intersect the vertical plane 32 along which the two plates 34,36 abut. Of course, each of these melt ducts 74 is located to intersect the vertical plane 32 in an area between the various branches 16 of the melt passage 12, and the number of ducts 74 required will depend upon the size and configuration of the melt flow system. As mentioned above, the abutting surfaces 38,40 of the plates 34,36 may be textured to promote dispersion of melt from the ducts 74 between them. An alternative is to provide fine grooves (not shown) extending along one of the surfaces 38,40 out from the ducts 74. In another alternative, the number of ducts 74 may be reduced, or in some cases eliminated entirely, by applying a plating of highly conductive material (not shown) to at least one of the opposed surfaces 38,40 of the plates before they are fastened together. Pairs of bolt holes 76 are drilled vertically through the manifold 10 to fasten the nozzles 20 in place with their central bores 50 in alignment with the respective outlet openings 18. After the heating element 58 is in position in the channel 56 in the upper surface 54 of the manifold 10, a hollow filler tube 78 is welded to the upper surface 54 of the manifold with its base 80 located over the channel 56. One slug 82 containing a predetermined quantity of highly conductive material is then inserted into the open mouth 84 of the filler tube 78, and other slugs 83 of highly conductive material are inserted into diagonal ducts 74. While the highly conductive material is preferably a copper alloy, other suitable conductive materials may be used in some instances. A batch of these assembled units are then inserted on trays 86 into a vacuum furnace 88, as shown schematically in FIG. 7. In the furnace, the units are heated under a partial vacuum to a temperature whereat the copper alloy slugs 82 and 83 melt and the copper alloy from the filler tube 82 flows downward into the channel 56 and surrounds the heating element 58, and the copper alloy from the ducts 74 flows down and diffuses along the abutting surfaces 38,40 of the plates 34,36. The effect of melting the copper alloy under a partial vacuum is that it fills the space 70 around the heating element 58 and forms a metallurgical bond with it and the surrounding channel. Also, the copper alloy which diffuses between the abutting surfaces 38,40 brazes the two plates 34,36 together and seals the melt passage 12 against leakage between the plates. The diffusing copper alloy runs between the plates 34,36 up to the melt passage 12 and thus provides the inside of the melt passage 12 with a smooth finish by filling the cracks where the two surfaces 38,40 abut. Thus, an integral structure is provided with the melt passage 12 having a smooth finish and no sharp bends, and the bond with the heating element acts to disperse heat rapidly away from the element 58. This avoids the creation of hot spots along the heating element and applies the heat more uniformly along the melt passage 12. Following removal of the manifold 10 from the vacuum furnace, it is then machined to remove the filler tube 78 and the heads of bolts 48 and the nuts provide the manifold with smoothly ground upper and lower surfaces 54,52.

Figure 8:
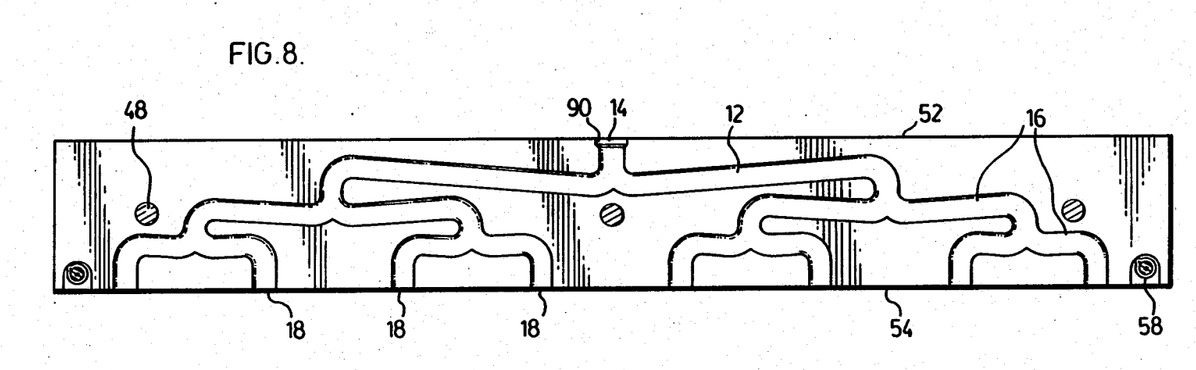
FIG. 8 is a sectional view of a completed manifold manufactured according to this embodiment of the invention.

FIG. 8 is a sectional view through the completed manifold 10 showing the tortuous path of the melt passage 12 leading to the different outlet openings 18. As may be seen, the melt passage 12 can be given any desired configuration to avoid having any sharp bends and to reduce the height of the manifold as much as possible. While the heating element 58 is shown adjacent the surface 54 with the outlet openings 18, it could have been located adjacent the surface 52 with the inlet opening 14. The inlet opening 14 has a recessed seat 90 to receive a backplate similar to that shown in FIG. 15. Of course, in more complex injection molding systems, it may be desirable to connect the outlet openings 18 to inlet openings of another manifold rather than directly to nozzles, in which case it may be necessary to machine or drill the manifold to provide different connecting means. Similarly, the number of melt passage branches 16 and outlet openings 18 which are provided will vary depending upon the design of the system and its application.

FIGS. 9 to 15 show successive steps in the manufacture of an injection molding manifold 10 according to another embodiment of the invention. As may be seen in FIG. 9, according to this embodiment, the two plates 34,36 formed of tool steel are joined with their opposed surfaces 34,36 abutting along a horizontal plane 92 rather than a vertical plane. While the first embodiment described above can slightly reduce the height of the manifold 10 required for a particular configuration, orienting the plates to join along a horizontal plane allows the manifold height to be reduced considerably which can be very advantageous for certain applications.

Figures 9, 10:
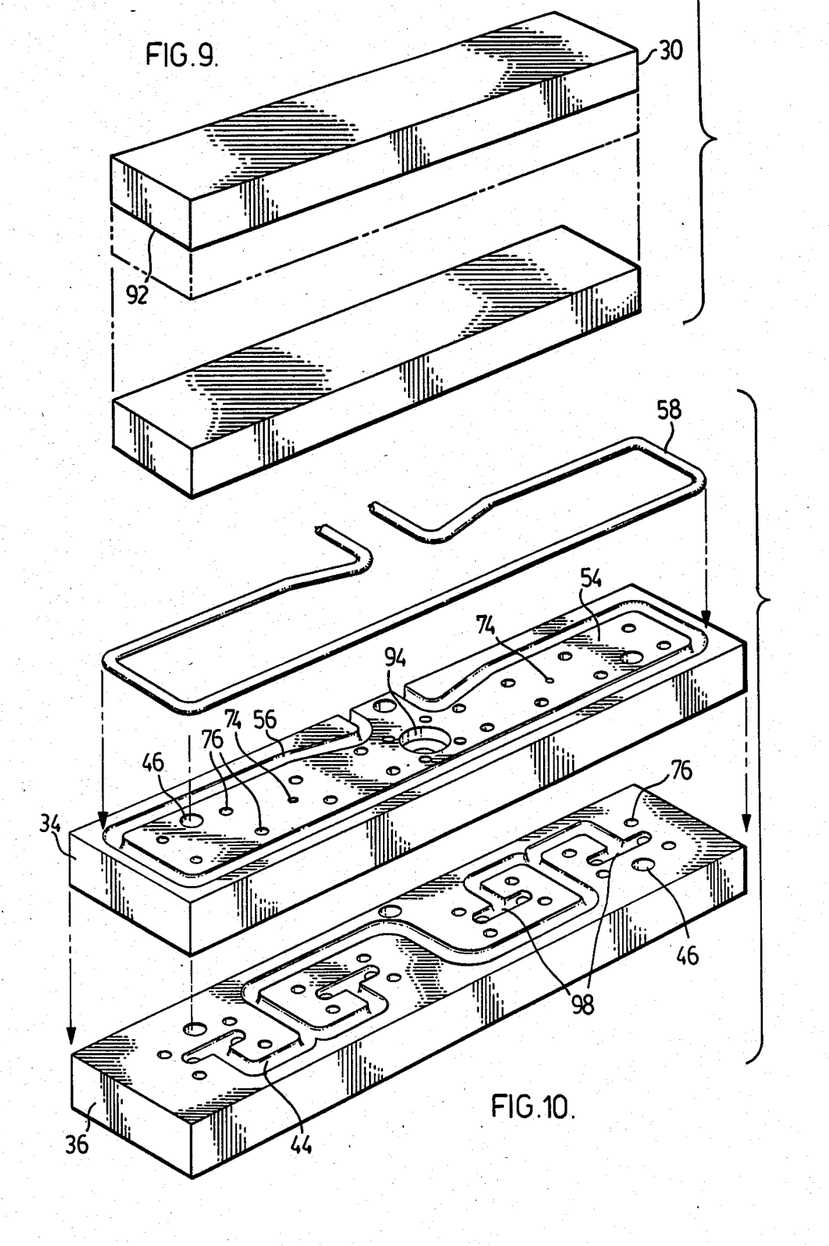
FIG. 9 is an isometric view showing two manifold plates prior to machining, having opposed vertical surfaces according to another embodiment of the invention.
FIG. 10 is an exploded isometric view showing the two plates after machining and a heating element to be inserted into a heating element channel cut in the upper surface of the upper plate.
Figure 11:
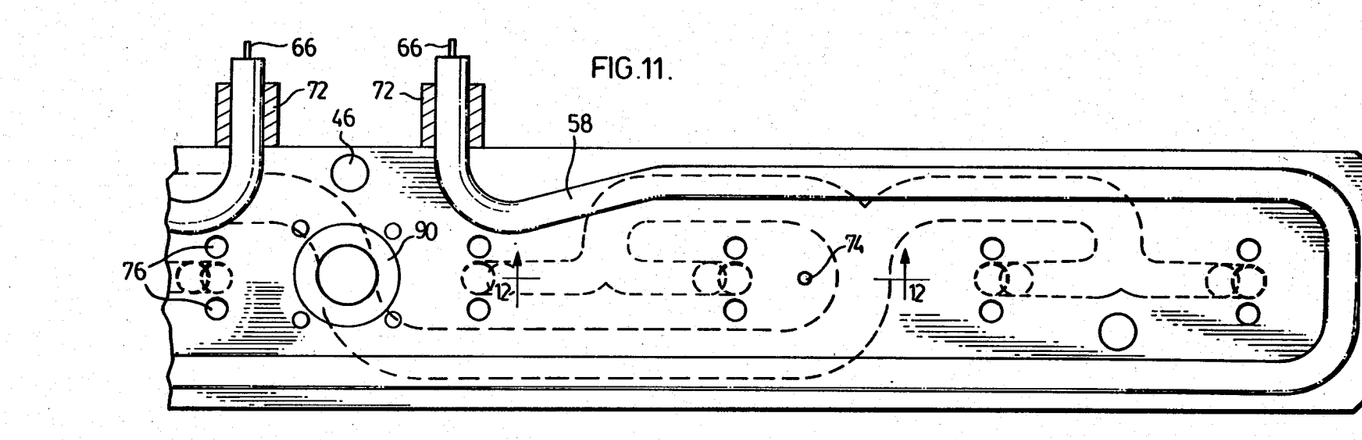
FIG. 11 is a plan view of a portion of the plates secured together with the heating element located in the channel.
Figure 12:
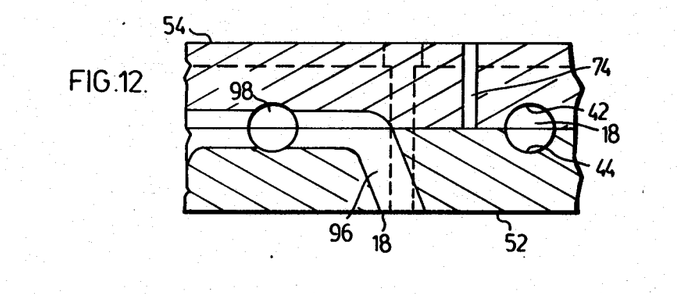
FIG. 12 is a partial sectional view along line 12—12 in FIG. 11.

Referring to FIG. 10, the opposed surfaces 38,40 of the plates 34,36 are milled to form grooves 42,44 (of which only one is shown in FIG. 10) according to a predetermined configuration. The grooves 42,44 are smoothly curved and match exactly so that when the plates 34,36 are joined, they form a horizontally extending melt passage 12. An inlet hole 94 is drilled to extend vertically through the upper plate 34 to connect the inlet opening 14 in the upper surface 54 to the middle of the groove 42 in the lower surface 38 of the upper plate 34 (see FIG. 14). Similarly, outlet holes 96 are drilled diagonally through the lower plate 36 to connect the ends 98 of the horizontally extending melt passage 12 to respective outlet openings 18 in the lower surface 52 (see FIG. 12). Thus, by having the melt passage 12 in a horizontal plane and drilling these inlet and outlet holes 94,96, a configuration having a large number of outlet openings can be provided without increasing the height of the manifold 10. However, this arrangement does have the disadvantage that relatively sharp bends are formed where the inlet and outlet holes 94,96 join the horizontal melt passage 12, but in certain applications this disadvantage is outweighed by the advantage of having reduced manifold height. Furthermore, a manifold can be provided having many outlet openings 18, but the melt will only have to flow through two relatively sharp bends regardless of which outlet opening it is going to, and all of the rest will be smoothly curved.

As seen in FIG. 10, the plates 34,36 are similarly drilled with vertical bolt holes 46 to receive bolts 48 to secure the plates 34,36 together. Also, pairs of vertically extending bolt holes 76 are provided to receive bolts (not shown) to attach the nozzles 20 with their central bores 50 extending from the outlet openings 18. A channel 56 is cut in the upper surface 54 of the upper plate 34 to receive an electrical heating element 58. In this embodiment, a number of small bores 74 are drilled vertically through the upper plate 34.

Figure 13:
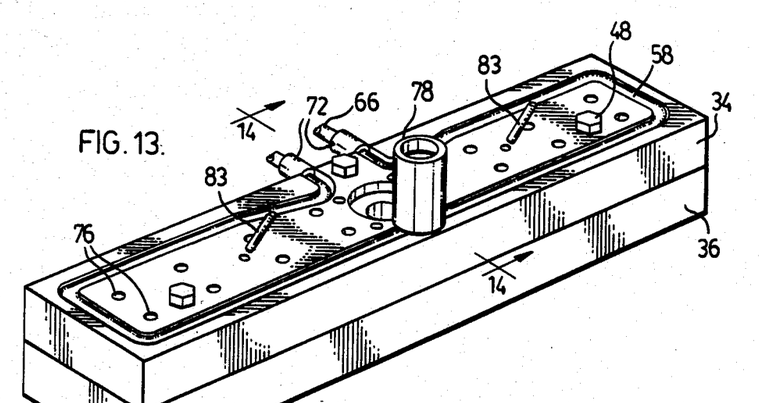
FIG. 13 is an isometric view showing the filler tube fixed in position over the channel.
Figure 14:
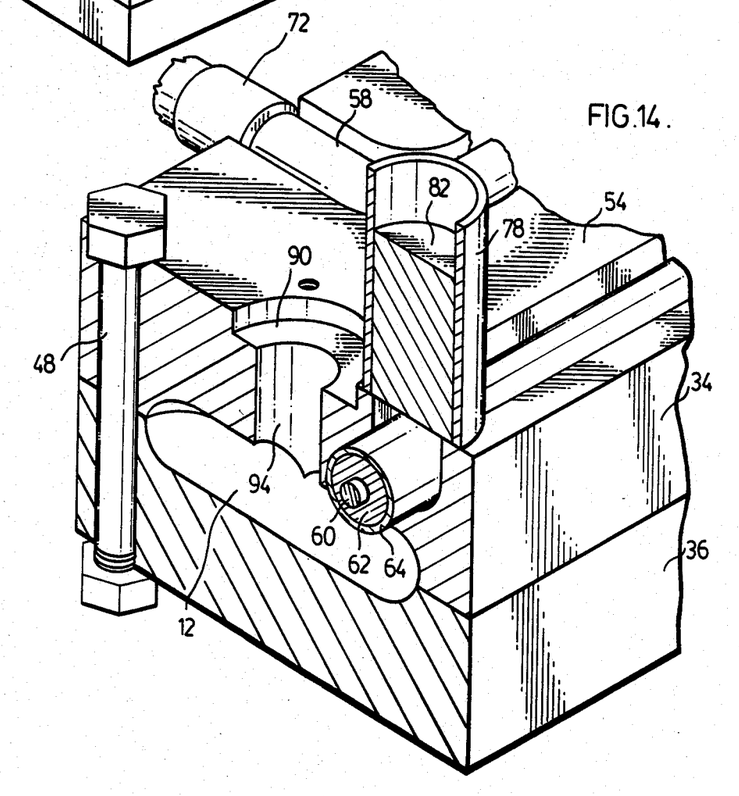
FIG. 14 is a cut away view of a portion of the assembly along line 14—14 in FIG. 13.

After the two plates 34,36 are fastened together by bolts 48 and the heating element 58 inserted into the channel 54, a filler tube 78 is welded to the upper surface 54. As described above in regard to the first embodiment, sealing sleeves 72 are slipped over the terminal ends 66 of the heating element 58 and welded to the upper plate 34 to seal channel 54 against leakage of the melt. One slug of copper alloy 82 is inserted into the filler tube 78 and other slugs 83 of predetermined quantities of highly conductive material are inserted into vertical ducts 74. The assembled unit is then heated under a partial vacuum in a vacuum furnace. This melts the copper alloy in the ducts 74 which runs down and disperses between the abutting surfaces 38,40 of the plates. The copper alloy in the filler tube 78 also melts and runs down into the channel 56. Thus, the electrical heating element 58 is cast into the channel 54 and the two plates 34,36 are brazed together to form an integral manifold. As described above, under the affect of the partial vacuum, the copper alloy forms a metallurgical bond with the tool steel and the casing 64 of the heating element 58 which improves heat transfer and provides the melt passage 12 with a smooth finish which does not leak.

Figure 15:
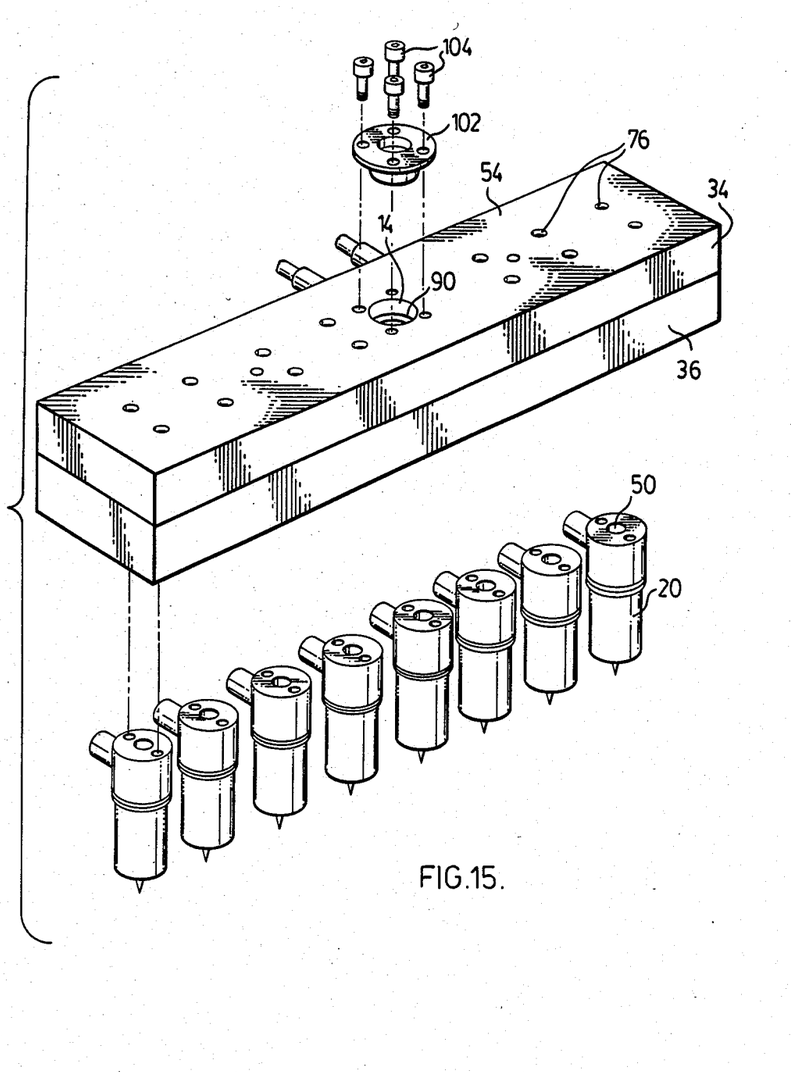
FIG. 15 is an exploded isometric view of a completed manifold manufactured according to this embodiment of the invention, showing the backplate and nozzles which are to be bolted to it.

After the manifold 10 is removed from the vacuum furnace 88, it is machined to remove the filler tube 78 and the heads of the bolts 48 and the nuts to provide it with smoothly ground upper and lower surfaces 54,52. A backplate 102 is then inserted into a recessed seat 90 around the inlet opening 14 and fastened in position by bolts 104. Nozzles 20 are then bolted to the manifold 10 with their central bore 50 each in alignment with one of the outlet openings 18. The manifold 10 and nozzles 18 are then mounted in a multi-cavity injection molding system in a conventional manner, similar to that shown in FIG. 1.

Although the description of this invention has been given with respect to particular embodiments, it is not to be construed in a limiting sense. Variations and modifications may now occur to those skilled in the art. For instance, it is apparent that the manifold 10 can be made with a different number of outlet openings 18 and that the melt passage 12 can have various configurations. For a definition of the invention, reference is made to the following claims.

What I claim is:

1. A method of manufacturing a composite injection molding manifold having a tortuous melt passage with several branches to convey melt from a common inlet opening to a plurality of aligned outlet openings, and an electrically insulated electrical heating element extending therein with at least one terminal end projecting therefrom; comprising the steps of:
    (a) forming two plates of tool steel having matching opposed surfaces;
    (b) machining matching grooves in the opposed surfaces of the plates, the grooves having bends which are smoothly curved to facilitate flow;
    (c) securing the two plates together with the opposed surfaces abutting in a position wherein the matching grooves form the melt passage to improve flow of the melt therethrough;
    (d) forming a channel in the upper external surface of the composite plates and locating the electrical heating element in the channel with at least one terminal end of the heating element extending from the channel, the heating element being secured in a predetermined position in the channel whereby a space is provided surrounding the heating element in the channel;
    (e) locating a filler tube with an open mouth and a base on the said upper surface with the base communicating with the channel;
    (f) sealing the channel around the said projecting terminal end of said electric heating element so as to seal the channel against substantial leakage and fixing the filler tube to the said upper surface;
    (g) inserting a predetermined quantity of highly conductive material into the filler tube;
    (h) heating the assembled unit in a vacuum furnace for a sufficient period of time under a partial vacuum and at a temperature whereby the highly conductive material is melted and flows into the continuous space around the heating element in the channel to form a metallurgical bond between the heating element and the highly conductive material and between the channel and the highly conductive material, and whereby highly conductive material provided between the abutting surfaces of the plates brazes the plates together and seals the melt passage against leakage; and
    (i) machining off the filler tube.

2. A method as claimed in claim 1 comprising the step of providing ducts to extend between the said upper surface and the abutting surfaces of the plates, and inserting a quantity of highly conductive material into each duct whereby in the vacuum heating step the highly conductive material in the ducts flows down and diffuses between the abutting plates to braze them together and seal the melt passage against leakage.

3. A method as claimed in claim 2 wherein the opposing surfaces of the plates are provided with textured finishes to facilitate the dispersion of the highly conductive material between them.

4. A method as claimed in claim 1 comprising the step of applying a plating of highly conductive material to at least one of the opposed surfaces of the plates before they are secured together, whereby in the vacuum heating step the plating of highly conductive material brazes the plates together and seals the melt passage against leakage.

5. A method as claimed in claim 2 wherein the melt passage, the inlet opening and the outlet openings are located in a common plane along which the matching opposed surfaces of the plates abut.

6. A method as claimed in claim 2 wherein the opposed surfaces of the plates having the matching grooves abut along a plane extending laterally through the manifold, and the melt inlet opening and the melt outlet openings are located on opposite external surfaces of the manifold on opposite sides of said lateral plane, comprising the further step of:
    drilling holes through the plates to extend between the melt inlet opening and outlet openings and the respective grooves, whereby the melt inlet opening and the melt outlet openings are connected to the melt passage formed by the grooves along said lateral plane, to provide for melt flow therebetween.

7. A method as claimed in claim 1 wherein the plates are formed by cutting a block of tool steel along a plane to form the matching opposed surfaces of the plates.

8. A method as claimed in claim 2 wherein the highly conductive material is a copper alloy.

* * * * *